Nov. 20, 1928.
S. SOTAK, JR
1,692,518
ALARM
Filed Nov. 18, 1925
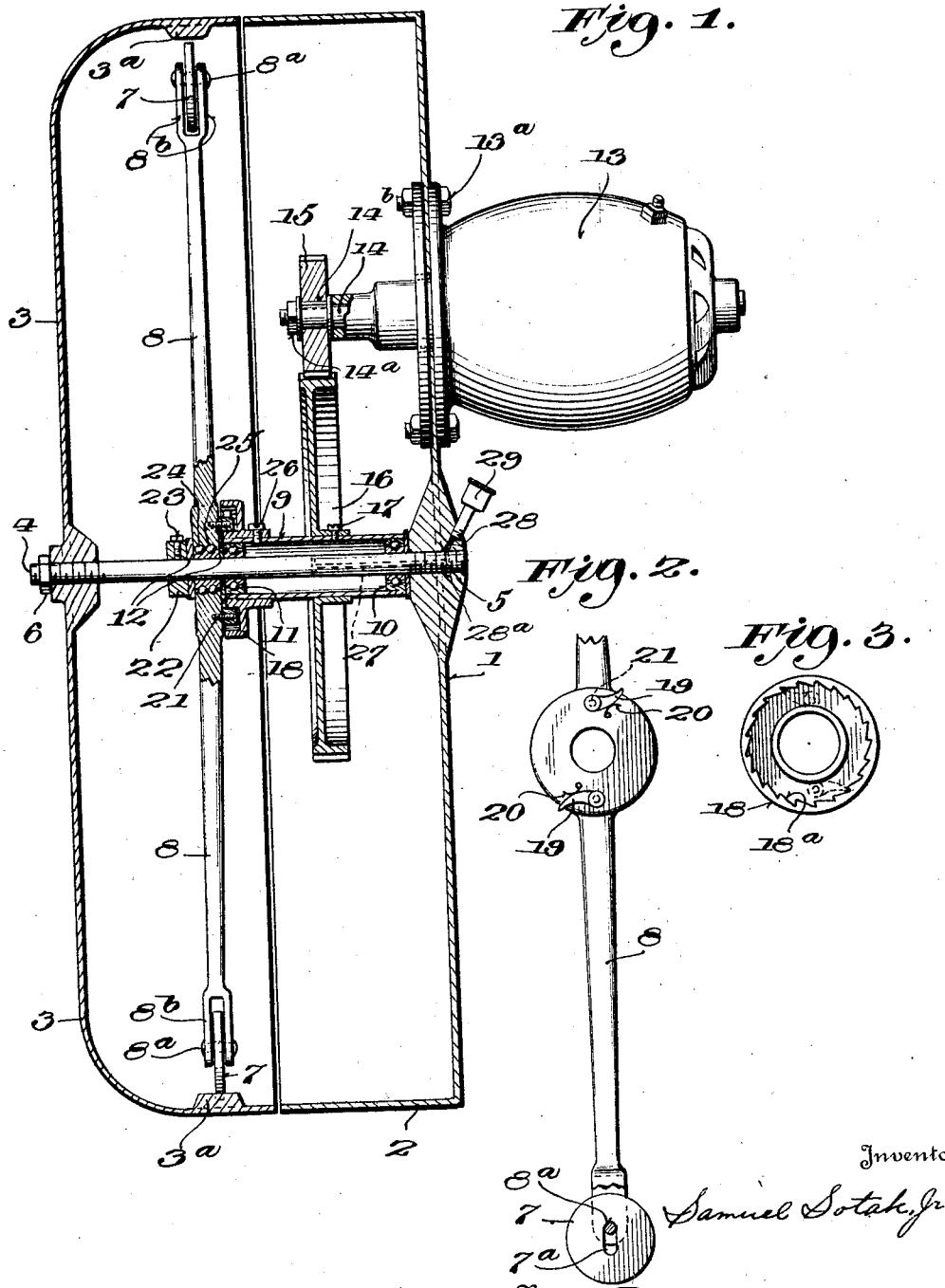
Inventor
Samuel Sotak, Jr.
By Prentiss, Stone & Boyden
Attorneys Patented Nov. 20, 1928.

1,692,518

UNITED STATES PATENT OFFICE.

SAMUEL SOTAK, JR., OF LANSFORD, PENNSYLVANIA.

ALARM.

Application filed November 18, 1925. Serial No. 69,864.

My invention relates to a motor driven alarm gong. The invention is particularly suitable for use as a warning signal, such as are used at railway crossings and for fire alarms.

Heretofore, electric motors have been used for gongs which have been characterized by relatively heavy structures and particularly by the fact that the striker parts cease to operate upon cessation of the motor current, and also because an especially designed motor was built into the bell housing, thus resulting in an expensive installation.

One of the features of the present invention is a gong adapted to be driven by a relatively small supplemental common duty auxiliary electric motor, and so coupled together that the normal high speed of the motor, through proper gearing, is reduced down to the speed desired for driving the bell parts.

Another advantageous feature results from the mechanism by which the moving striker parts of the bell may continue to operate after the electric motor and its gearing have ceased movement.

One embodiment of my invention is described in the present specification, and illustrated in the accompanying drawings, wherein:—

Figure 1 is a partly sectional elevation of the gong;

Figure 2 is a rear elevation of the counterbalanced revolving arms, portions being broken away; and Figure 3 is a front elevation of a collar and ratchet gear embodied in the mechanism.

The gong comprises a bell 3, threaded on a shaft 4, and secured by a lock nut 6, the shaft itself being screw threaded at 5 into the housing 1, 2. A tubular shaft-member 9 is mounted rotatably on shaft 4 by means of ball bearings 10, 11 at its ends, as shown. A counterbalanced striker member comprising two oppositely extending arms 8 radiating from a central hub is mounted on ball bearings 24, 25 both supported by a shaft 4, so as to be free to rotate with respect to tubular shaft member 9 and independently thereof. Each end of the member 8 is bifurcated as shown at 8$^b$. A disk 7, having an elongated slot 7$^a$ is carried by a pin 8$^a$ in each of said bifurcations 8$^b$. These disks cooperate with lugs 3$^a$ formed in the bell 3 to strike said lugs at every half-revolution, thereby sounding the bell. The slots 7$^a$ allow the disks to yield inwardly upon striking the lugs. A collar 22 secured to tubular member 9 by a screw 23 retains the ball bearing 24, 25 in place on the left, and a collar 18 secured to member 9 by screw 26 retains the said ball bearings from moving to the right. The collar 18 is formed with an annular groove, as shown, and has a set of ratchet teeth 18$^a$ cut in the outer surface of said groove, as shown best in Figure 3. These teeth cooperate with pawls 19, pivoted at 21 to member 8, and urged outwardly by springs 20, as shown in Figure 2. This construction allows the member 8 to rotate freely in a clockwise direction, as viewed from the front, without requiring the member 9 to partake of its rotation. Spacing washers 12 are provided at opposite sides of hub of the member 8, the one next adjacent the tubular member 9 having holes therethrough for the passage of oil, as will be described.

A gear 16 is secured to member 9 by screw 17, and meshes with pinion 15, which is secured to shaft 14, of motor 13, as by a nut 14$^a$ and key 14$^b$. The electric motor 13 is secured to the rear wall 1 of the casing by bolts 13$^a$.

Lubrication is provided by means of a bore 27, extending into shaft 4 and communicating with the inside of tubular member 9. The outer end of bore 27 communicates with oil duct 28 in the housing 1 and oil cup 29. The duct 28 leads into an annular groove 28$^a$ which encircles the shaft 4. The oil is distributed from the interior of member 9 to the two bearings 10, 11, and also beyond the bearing 11 and past its next adjacent spacing washer to the bearings 24, 25, as well as to the pawls 19 and ratchet 18, thus thoroughly lubricating all the wearing parts of the mechanism.

In operation, the motor 13 will, in the specific embodiment illustrated, cause the shaft 9 to revolve in a clockwise direction, the motor being properly chosen to ensure rotation in the desired direction. Rotation of shaft 9 will cause the teeth 18$^a$ of the ratchet wheel 18 to positively drive the pawls 19 whenever the motor rotates. This will cause the arms 8 to carry the disks 7 around the interior of the bell 3, striking the lugs 3$^a$ and thereby ringing the bell. Upon stoppage of the motor 13, the gears 15 and 16 will, of course, also cease to revolve, but the momentum of arms 8 will cause these to continue to revolve, the pawls 19 riding freely over the teeth 18$^a$. The result is that the bell will continue to ring for some time after the current ceases to flow through the windings of the motor 13, and the warning signal is thus prolonged. The ball bearings used at 10, 11, 24 and 25 serve to minimize the friction, and also assist in increasing the time the signal operates after the current is shut off.

From the foregoing description, it is obvious that the gong is simple in construction, that a standard type of motor may be used, and that the ultimate cost of construction is accordingly very low.

What I claim is:—

1. A signal device comprising a supported stud carrying an alarm member, a hollow shaft rotatably mounted concentrically with the stud and supported by it, a member co-operating with said alarm member and mounted on said stud and rotatable independently of said hollow shaft, and means connecting said co-operating rotatable member and the hollow shaft for effecting such independent rotation in but one direction.

2. A signal device comprising a supported stud carrying a gong, a shaft mounted concentrically with, and rotatable relatively to said stud, a striker for the gong mounted on said stud, and rotatable independently of said hollow shaft and a one-way clutch connecting the striker and the hollow shaft whereby such independent rotation is confined to one direction only.

3. A signal device comprising a stud carrying an alarm member and a low-friction, freely rotatable signal means having its weight concentrated near its end portion and co-operating with said alarm member, said signal means being connected for rotation through a loose clutch from a hollow shaft mounted for rotation.

4. A signal device comprising an alarm member and a signal means mounted co-operatively therewith and having the greater part of its weight concentrated away from its center of rotation, said rotary signal means being freely rotatable from a hollow shaft by a loose clutch and driven by means which includes a heavy rotating part.

In testimony whereof I affix my signature.

SAMUEL SOTAK, JR.